July 31, 1928.

G. W. BLACKBURN

SPEEDOMETER

Filed April 9, 1924

Inventor.
Guy W. Blackburn.
by Parker & Carter
Attorneys.

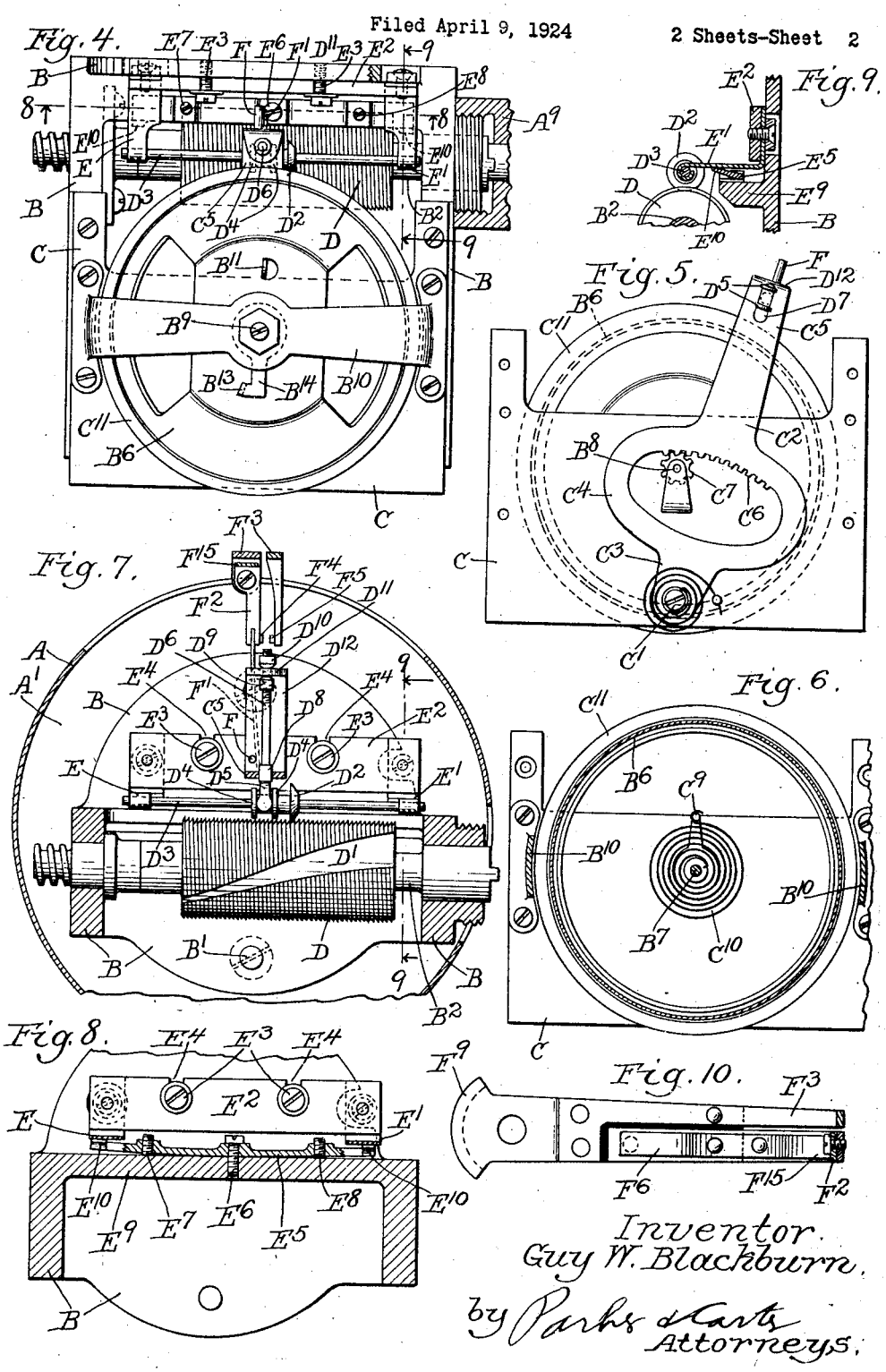

Patented July 31, 1928.

1,679,203

UNITED STATES PATENT OFFICE.

GUY W. BLACKBURN, OF ELGIN, ILLINOIS.

SPEEDOMETER.

Application filed April 9, 1924. Serial No. 705,235.

My invention relates to improvements in tachometers or speed indicators, such as are particularly adapted for use in connection with indicating the speed of automotive vehicles and the like, though also well adapted for any service where it is desired to indicate speed in terms of revolutions per minute, miles per hour or any other unit.

One object of my invention is to provide a mechanical speed indicator which will be compact, noiseless and accurate and which will maintain this accuracy throughout the entire speed range, and which will always return to the zero when the machinery, the speed of which is being indicated, ceases to operate. Another object is to provide a mechanical speed indicator of such size and shape as will be well adapted for use in connection with the instrument board of an automotive vehicle. Another object is to provide in connection with a speed indicator separate means for giving a positive signal in the event that a certain predetermined speed has been exceeded and to provide a switch which can be used for any desirable purpose, as for indicating or stopping the vehicle when a certain speed has been exceeded. Other objects will appear from time to time in the specification.

My invention is illustrated more or less diagrammatically in the accompanying drawings, wherein—

Figure 4 is a top plan view of the mechanism in part section as it appears removed from the housing, showing the parts for illustration in the position that they would assume at thirty miles an hour on an automotive vehicle;

Figure 5 is an inverted plan view of the parts shown in Figure 4;

Figure 6 is a horizontal section through the indicating drum;

Figure 7 is a section along line 7—7 of Figure 3;

Figure 8 is a section along line 8—8 of Figure 4;

Figure 9 is a section with parts omitted along line 9—9 of Figure 7;

Figure 10 is a detail of the speed limit switch.

Like parts are indicated by like characters throughout.

Figure 1:
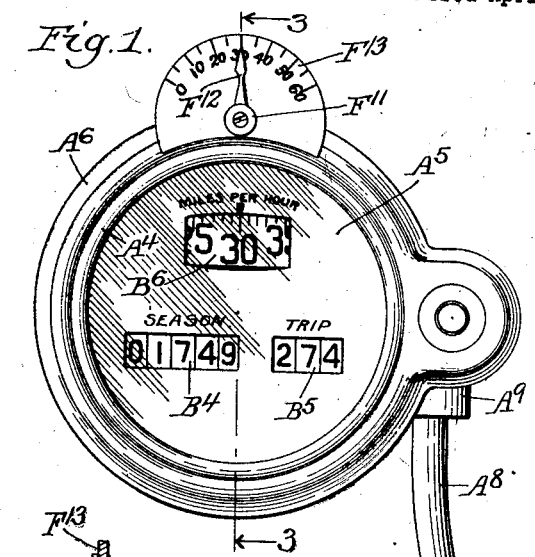
Figure 1 is a front elevation.
Figure 2:
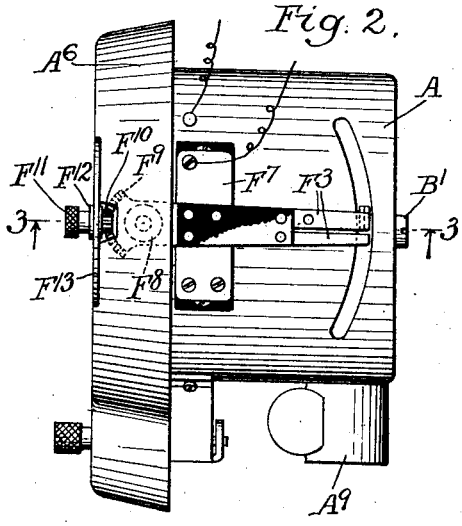
Figure 2 is a top plan view.
Figure 3:
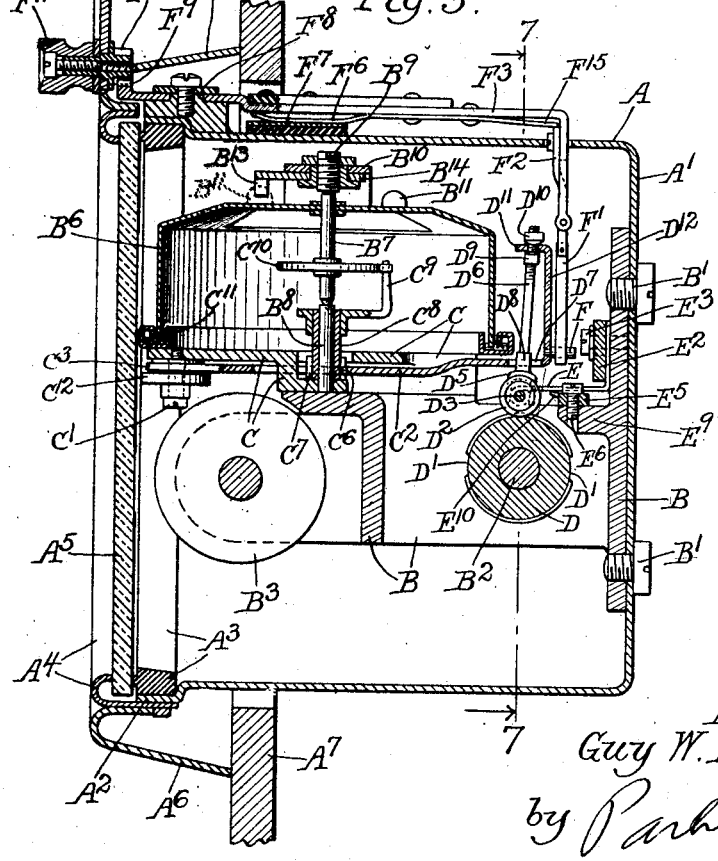
Figure 3 is a section along line 3—3 of Figures 1 and 2.

A is a cylindrical metallic housing having a closed end $A^1$ and open at the other end. $A^2$ is a flared flange surrounding the open end and containing a packing ring $A^3$ of rubber or other suitable material. $A^4$ is a cover ring slidable on the flange $A^2$ and adapted to hold a cover $A^5$ of glass or other suitable material in the open mouth of the housing, against the packing ring $A^3$. $A^6$ is a collar associated with the cover ring $A^4$, outwardly flared and adapted to rest against the face of an instrument board $A^7$ and to close and protect the opening through which the apparatus is inserted in such board. $A^8$ is a flexible shaft or other suitable form of power transmitting means by which power is transmitted from the machinery, the speed of which is indicated, to the apparatus through the usual type of worm gear not here shown, enclosed in the housing $A^9$.

B is a supporting frame held by cap screws $B^1$ on the closed end of the housing $A^1$. This supporting frame carries an indicator shaft $B^2$ driven by the worm gear in housing $A^9$ and also carries a revolution counter $B^3$, the details of which form no part of my invention and are not here illustrated. This revolution counter preferably takes the form of season and trip indicator wheels $B^4$ $B^5$ visible through the face of the cover $A^5$, and are driven by any suitable means, not here shown, in response to the rotation of the shaft $B^2$. $B^6$ is a speed indicating drum closed at the top and open at the bottom. It is mounted in and rotates with a spindle $B^7$. The lower pointed end of the spindle rests on a fixed pin $B^8$ projecting upwardly from the frame C. The upper pointed end is guided in the adjusting screw $B^9$ in the bracket $B^{10}$, mounted on the frame C. An ear $B^{11}$ projects upwardly from the top of he drum $B^6$, adapted to engage the downwardly bent end $B^{13}$ of a stop arm $B^{14}$, rotatably adjustable on the bracket $B^{10}$ to limit the excursion of the speed indicating drum when returning to zero.

C is a bracket fixed on the frame B and associated with the pin $B^8$, projecting forwardly toward the front end of the housing. This bracket carries a pivot pin $C^1$, upon which is rotatably mounted the lever $C^2$, which lever comprises a fulcrum $C^3$, a closed loop $C^4$ surrounding but out of contact with a part of the bracket C, a pin $B^8$ and operating end $C^5$. $C^6$ is a curved rack concentric with the center of rotation of the lever, in mesh with a pinion $C^7$ on a sleeve $C^8$, which sleeve is rotatable on the pin $B^8$ and carries a driving arm $C^9$ connected by means of a coiled spring $C^{10}$ to the pin $B^7$ so that rotation of the lever $C^2$ rotates the pinion $C^7$, the arm $C^9$ and through the coiled spring $C^{10}$ the pin $B^7$ and drum $B^6$. $C^{11}$ is an oil channel mounted on the bracket C and containing oil into which the lower edge of the drum $B^6$ dips. This oil is relatively thick so as to damp or check the rotation of the drum $B^6$ and have a dash pot effect upon it. $C^{12}$ is a coiled spring interposed between the pin $C^1$ and the lever $C^2$ and tending at all times to yieldingly thrust the lever toward the left as viewed in Figures 4 and 7, and with it the drum in the zero speed position. Rotation of the lever in a clock-wise direction against the spring causes it to carry with it the drum $B^6$ and indicate speed.

Mounted on the shaft $B^2$ is a tachometer screw D. This screw is cylindrical and has a fine thread thereon. This thread is interrupted by two diametrically opposed slots $D^1$ $D^1$ wound spirally about the cylinder in a direction opposite to the lead of the thread, and increasing in width from the left or zero end of the cylinder to the right so that the effective length of uninterrupted thread decreases toward the right or high speed end of the screw. $D^2$ is a sharp edged roller having one surface toward the left or low speed end perpendicular to the axis of rotation and a conical surface toward the right or high speed end of the screw. This roller is rotatably and slidably mounted on the thin light bearing rod $D^3$, and it is provided with collars $D^4$ adapted to be engaged by a fork $D^5$ on a universal joint pin $D^6$. This pin engages a radial slot $D^7$ in the working end $C^5$ of the lever $C^2$, this slot being of substantially the same width as the diameter of the collar $D^8$ on the pin. The upper end of the pin $D^6$ is provided with two opposed spherical surfaced collars $D^9$ $D^{10}$ one engaging the upper and the other the lower side of a perforate flange $D^{11}$, inwardly projecting from the extension $D^{12}$ on the end of the lever $C^2$. This furnishes a connection between the pin $D^6$ and the lever $C^2$ so that as the roller travels laterally in a direction parallel with the axis of rotation of the screw it changes its distance from the center of rotation of the lever, and it is free to swing, but it is held against angular movement with respect to the lever. The result of this is that movement of the roller $D^2$ imparts a positive angular movement to the lever $C^2$.

The pin $D^3$ is mounted at either end in spring brackets E, $E^1$ on the adjustable carriage $E^2$. This carriage is mounted on a base B, being held in position thereon by the screws $E^3$ engaging slots $E^4$ in the carriage $E^2$ so that the carriage springs, pin and roller may be moved radially toward and from the screw to adjust the engagement of the roller with the screw. These springs E $E^1$ project outwardly and are engaged by a main spring $E^5$ which is rigidly mounted on the frame B. There are three adjusting screws for this main spring, a central screw $E^6$, and end screws $E^7$ $E^8$ all associated with the lug $E^9$ on the member B so that the up and down movement of the entire spring assembly may be noiselessly adjusted. The two end screws $E^7$ $E^8$ are associated with adjusting cams $E^{10}$ whereby the downward pressure of the two springs E $E^1$ may be separately adjusted to control the spring pressure of the roller toward the screw and to insure that the roller will engage the screw but be free to slip over the screw if that becomes necessary as later pointed out.

On the end of the lever $C^2$ is a stop pin F. This stop pin F is adapted to be engaged when the speed reaches a predetermined point by a spring finger $F^1$ downwardly extending from a contact arm $F^2$. This contact arm is pivoted on the adjustable speed limit lever $F^3$ and carries a contact plug $F^4$ in opposition to a contact plug $F^5$ fixed on the lever $F^3$. This contact member $F^2$ is insulated from the balance of the lever $F^3$, has a spring arm $F^6$ engaging a spring contact plate $F^7$, the contact being normally held open by the end $F^{15}$ of the spring arm $F^6$. The lever $F^3$ is pivoted on a plug $F^8$ and is associated with a segment gear $F^9$ in mesh with an adjusting pinion $F^{10}$ associated with a thumb screw $F^{11}$ having a pointer $F^{12}$ working across the face of the dial $F^{13}$. As shown in the drawing the pointer is set for thirty miles per hour. When the speed reaches that point the pin F engages the spring $F^1$ to bring the two contact members $F^4$ $F^5$ together and closes an electrical circuit. This circuit may ring a bell, operate an indicator of some other kind or may be connected up to any suitable mechanism for stopping the engine, as for instance by disconnecting the ignition circuit. By manipulating the pointer the speed at which this contact takes place may be set for any desired point.

It will be evident that while I have shown in my drawings an operative device, still many changes might be made in the size, shape and arrangement of parts without departing materially from the spirit of my invention. I wish, therefore, that my showing be taken as in a large sense diagrammatic. The spiral slot is provided so as to insure that as the vehicle slows down there will be little if any danger of the carrier being caught on the thread and locked into a position where it would indicate a speed with the vehicle at rest. Experience showed with earlier types where the groove was parallel with the axis and not spiralled about it that this would sometimes happen and that the addition of the spiral slot would prevent it.

The use and operation of my invention are as follows:

The mutilated screw is connected to the road wheel or vehicle or to a moving part in any desired way as for instance, by means of a flexible shaft not here shown. It rotates at a speed bearing a direct relation to the moving part, the speed of which is to be indicated. As it rotates it pulls the sharp edged roller away from the zero end of the screw toward the high speed end and as the roller travels longitudinally along the screw, it carries with it the lever, and the flexible conection between the lever and roll and their support permits the movement of the parts with a minimum of friction and lost motion. As the lever is rotated, the yielding adjustable spring is compressed and tends always to resist movement of the roll and lever and tends to return them to the zero position.

As the roll travels up the thread, the thread effectively decreases because of the increased width of the slot or multilation of the thread. The result of this is that as the roll travels up it finally reaches a point where the backward movement under the urge of the lever and spring during the time when the roll is out of contact with the thread is equal to the upward movement during the time when the roll is in contact with the thread and a position of equilibrium is reached. This position varies dependent upon the speed of rotation of the thread. At this point the lever will remain generally at rest having a slight vibration.

As the lever rotates it carries with it the rotating drum and it is this rotating drum which gives a legible speed indication but since the drum is of relatively large mass and since it is connected to the lever by a spring which tends to damp out or absorb the vibration of the lever, the drum will remain at rest, this being aided by the damping effect of the viscous material in which the lower edge of the drum is immersed. Thus, while the lever has a slight movement, as the roll moves back and forth along the thread, the drum will give a positive and fixed indication.

There are a number of associated adjusting or calibrating parts. If the operator changes the tension on the spring resisting the rotation of the lever, he will cause the lever to go back a longer or a shorter distance during the time when the roll is out of contact with the thread. He also can move the roll toward and from the thread so as to change slightly the point of engagement and thus the apparatus can be accurately calibrated to give proper speed indications.

The sharp edge on the roller engaging with the sharp screw threads and owing to the light weight of the roller itself, permits the operation of the device to be exceedingly quiet and insures that if the sharp edge of the roller should happen to strike the apex of the thread, it will slide off onto the thread itself and a correct indication be given. The spring support for the roller makes this possible.

It might sometimes happen if the slot or place where the threads are cut away are parallel with the axis of rotation that the indicator would stop, if the machine stops suddenly leaving the roller in engagement with the thread and giving a speed indication, but when the parts are at rest by winding the slot around the axis of rotation, this is impossible because there is always ample time for the roller to drop back to the zero position as the screw slows down.

The electric circuit closing means are provided so that the operator can set the adjustable side of the switch at any desired speed and then when the lever is raised up to that speed indication, the pin on the lever will engage a switch arm and close an electrical circuit. This might ring a bell or disconnect the motor of the vehicle with which the speedometer is used from the ignition, or anything that can be done by a relatively small electric current such as can be controlled by a switch of this type.

I claim:

1. In a speed indicator, a rotatably mounted visual indicating drum, mechanical means for rotating it through a predetermined angle in response to speed variations and yielding means for resisting the rotation of the drum, said means comprising a receptacle containing an oil bath in which the edge of the drum only is immersed.

2. In a speed indicator, a rotatably mounted visual indicating drum, means for rotating it through a predetermined angle in response to speed variations and yielding means for resisting the rotation of the drum comprising a receptacle surrounding a portion of the drum only and a viscous liquid contained therein in which the drum is partially immersed.

3. The combination with a rotating visual indicating drum for speed indicators and the like of an annular liquid containing ring in which the lower edge of the drum only is immersed.

4. The combination with a rotating visual indicating drum for speed indicators and the like of an annular liquid containing ring in which the lower edge of the drum only is immersed, and a closure for the ring adapted to form a liquid reservoir and hold the liquid therein independent of the position thereof.

5. A speed indicator comprising a threaded cylinder, a carrier in engagement therewith and adapted to be moved therealong by rotation thereof, yielding means for resisting such movement, there being a slot in the periphery of the cylinder interrupting the thread, increasing in width in the direction of travel of the carrier, the axis of the slot being substantially inclined to both sides of the cylinder.

6. In a speed indicator, a threaded cylinder having a slot in the periphery thereof interrupting the thread and increasing in width from one end of the cylinder to the other, a member mounted for movement parallel with the axis of the cylinder and adapted to engage the thread, the slot being wound about the cylinder both sides of the slot being inclined to the axis of the cylinder.

7. In a speed indicator, a threaded cylinder having a slot in the periphery thereof interrupting the thread and increasing in width from one end of the cylinder to the other, a member mounted for movement parallel with the axis of the cylinder and adapted to engage the thread, the slot being wound about the cylinder in a direction opposite to the thread both sides of the slot being inclined to the axis of the cylinder.

8. In a speed indicator, a threaded cylinder, a roller having a single sharp edge adapted to engage the thread, a guide rod therefor parallel with the cylinder and upon which the roller is slidably and rotatably mounted.

9. In a speed indicator, a threaded cylinder, a roller having a single sharp edge adapted to engage the thread, a guide rod therefor parallel with the cylinder and upon which the roller is slidably and rotatably mounted, and yielding means for supporting the guide rod.

10. In a speed indicator, a threaded cylinder, a roller having a single sharp edge adapted to engage the thread, a guide rod therefor parallel with the cylinder and upon which the roller is slidably and rotatably mounted, yielding means for supporting the guide rod, and means for adjusting the rod independently at each end toward and from the roller.

11. In a speed indicator, a threaded cylinder, a roller having a single sharp edge adapted to engage the thread, a guide rod therefor parallel with the cylinder and upon which the roller is slidably and rotatably mounted, yielding means for supporting the guide rod, and means for independently adjusting the tension at each end to move the roller toward and from the roller.

12. In a speed indicator, a threaded cylinder, a roller having a single sharp edge adapted to engage the thread, a guide rod therefor parallel with the cylinder and upon which the roller is slidably and rotatably mounted, a carriage for the guide rod and means for moving it radially toward and from the cylinder.

13. In a speed indicator, a threaded cylinder, a roller having a single sharp edge adapted to engage the thread, a guide rod therefor parallel with the cylinder and upon which the roller is slidably and rotatably mounted, a carriage for the guide rod and means for moving it radially toward and from the cylinder, and yielding means for supporting the guide rod on the carriage.

14. In a speed indicator, a threaded cylinder, a roller having a single sharp edge adapted to engage the thread, a guide rod therefor parallel with the cylinder and upon which the roller is slidably and rotatably mounted, a carriage for the guide rod and means for moving it radially toward and from the cylinder, yielding means for supporting the guide rod on the carriage, and means for independently adjusting the tension of the yielding supporting means at either end of the guide rod.

15. In a speed indicator, a lead screw, a roll engaging the thread thereof and adapted to be moved thereby to give speed indication and a yielding support for the roll, the roll having a single sharp edge adapted invariably to penetrate between the threads.

16. A speed indicator comprising a mutilated screw, the effective length of the threads of which decrease from the zero end, a sharp edged roll in engagement with and mounted for movement therealong, and a yielding adjustable support therefor, a speed indicating lever and a flexible connection between it and the roll whereby the lever may be rotated by movement of the roll along the thread, yielding means resisting such rotation and tending to return the lever and roll toward the zero end of the screw, an independently supported rotatable indicating drum, a yielding driving connection between it and the lever and means associated with the drum for damping its vibration.

17. A speed indicator comprising a mutilated screw, the effective length of the threads of which decrease from the zero end, a sharp edged roll in engagement with and mounted for movement therealong, and a yielding adjustable support therefor, a speed indicating lever and flexible connection between it and the roll whereby the lever may be rotated by movement of the roll along the thread, yielding means resisting such rotation and tending to return the lever and roll toward the zero end of the screw, an independently supported rotatable indicating drum, a yielding driving connection between it and the lever.

18. A speed indicator comprising a mutilated screw, a sharp edged roll in engagement therewith, a speed indicating lever engaging and driven by movement of the roll and an indicating drum, a drive connection between it and the lever, an independent supporting means for the screw, roll, lever and drum being each independently supported.

19. A speed indicator comprising a mutilated screw, the effective length of the threads thereof decreasing from one end of the screw to the other, a single guide rod positioned adjacent the screw and a single roller longitudinally movable along said guide rod and in mesh with said screw.

20. A speed indicator comprising a mutilated screw, the effective length of the threads thereof decreasing from one end of the screw to the other, a single guide rod positioned adjacent the screw and a single roller longitudinally movable along said guide rod and in mesh with said screw, said guide rod being yieldably mounted.

21. A speed indicator comprising a mutilated screw, the effective length of the threads thereof decreasing from one end of the screw to the other, a single guide rod positioned adjacent the screw and a single roller longitudinally movable along said guide rod and in mesh with said screw, said guide rod being yieldably mounted and being adjustable toward and from the screw.

22. The combination of a screw and a follower adapted to engage it of means for guiding the follower along the screw, a lever mounted for rotation about an axis removed from the screw, a pin loosely swung in the lever at one end engaging the follower at the other end and means on the lever adapted to loosely engage the pin to transmit motion from the follower to the lever.

23. The combination of a screw and a follower adapted to engage it of means for guiding the follower along the screw, a lever mounted for rotation about an axis removed from the screw, a pin loosely swung in the lever at one end engaging the follower at the other end and means on the lever adapted to loosely engage the pin to transmit motion from the follower to the lever, the follower comprising a grooved sleeve and a sharp edged comb, the edge of which engages the pin, the pin being grooved to loosely engage the groove.

24. The combination of a screw and a follower adapted to engage it of means for guiding the follower along the screw, a lever mounted for rotation about an axis removed from the screw, a pin loosely swung in the lever at one end engaging the follower at the other end and means on the lever adapted to loosely engage the pin to transmit motion from the follower to the lever, the means for guiding the follower being adjustable toward and from the screw independent of the action between the follower and the lever.

25. The combination of a screw and a follower adapted to engage it of means for guiding the follower along the screw, a lever mounted for rotation about an axis removed from the screw, a pin loosely swung in the lever at one end engaging the follower at the other end and means on the lever adapted to loosely engage the pin to transmit motion from the follower to the lever, the follower comprising a grooved sleeve and a sharp edged comb, the edge of which engages the pin, the pin being grooved to loosely engage the groove, the means for guiding the follower being adjustable toward and from the screw independent of the action between the follower and the lever.

Signed at Chicago county of Cook and State of Illinois, this 8th day of April, 1924.

GUY W. BLACKBURN.